US005753685A

United States Patent [19]

Sakoske

[11] Patent Number: 5,753,685

[45] Date of Patent: May 19, 1998

[54] PARTIALLY CRYSTALLIZING ENAMEL CONTAINING CRYSTALLINE ZINC BORATE SEED MATERIAL

[75] Inventor: George E. Sakoske, Mayfield Hts., Ohio

[73] Assignee: Cerdec Corporation, Washington, Pa.

[21] Appl. No.: 876,426

[22] Filed: Jun. 16, 1997

Related U.S. Application Data

[62] Division of Ser. No. 637,445, Apr. 25, 1996, Pat. No. 5,677,251.

[51] Int. Cl.$^6$ .............. C03B 32/02

[52] U.S. Cl. .............. 427/376.2; 65/33.4; 65/33.6; 501/10; 501/17

[58] Field of Search .............. 427/376.2; 65/33.4, 65/33.6; 501/10, 17

[56] References Cited

U.S. PATENT DOCUMENTS

| | | | |
|---|---|---|---|
| 4,306,012 | 12/1981 | Scheve | 430/296 |
| 4,596,590 | 6/1986 | Booz | 65/60.51 |
| 4,649,062 | 3/1987 | Kosiorek et al. | 427/54.1 |
| 4,684,389 | 8/1987 | Booz | 65/24 |
| 4,770,685 | 9/1988 | Booz | 65/106 |
| 4,857,098 | 8/1989 | Booz | 65/60.51 |
| 4,983,196 | 1/1991 | Stotka | 65/24 |
| 5,037,783 | 8/1991 | Booz | 501/19 |
| 5,079,193 | 1/1992 | Donohue | 501/17 |
| 5,153,150 | 10/1992 | Ruderer et al. | 501/17 |
| 5,208,191 | 5/1993 | Ruderer et al. | 501/17 |
| 5,286,270 | 2/1994 | Ruderer et al. | 65/33 |
| 5,346,651 | 9/1994 | Oprosky et al. | 252/514 |
| 5,559,059 | 9/1996 | Ryan | 501/17 |

FOREIGN PATENT DOCUMENTS

| | | |
|---|---|---|
| 0 490 611 | 6/1992 | European Pat. Off. . |

*Primary Examiner*—Karl Group
*Attorney, Agent, or Firm*—Wenderoth, Lind & Ponack

[57] ABSTRACT

A ceramic enamel composition is described which contains a zinc-containing oxide frit, a zinc borate seed material, a pigment, and a vehicle. The zinc borate seed material is preferably crystalline in nature, and promotes crystal growth upon firing. A preferred crystalline zinc borate seed material is selected from the phases $Zn_3B_2O_6$ and $Zn(BO_2)_2$, and mixtures thereof. Upon firing and press-forming a glass substrate coated with the enamel, components of the enamel adhere to the substrate while reducing sticking of the coated region to the forming die. The ceramic enamel is particularly useful in providing a colored border around the periphery of automotive glass and is effective in improving appearance and reducing degradation of underlying adhesives by ultra-violet radiation.

3 Claims, No Drawings

PARTIALLY CRYSTALLIZING ENAMEL CONTAINING CRYSTALLINE ZINC BORATE SEED MATERIAL

This application is a division of application Ser. No. 08/637,445, filed Apr. 25, 1996 now U.S. Pat. No. 5,677, 251.

FIELD OF THE INVENTION

The present invention relates to zinc-based ceramic enamels useful as colored borders of automotive glass.

BACKGROUND OF THE INVENTION

Ceramic enamels can be used for a variety of applications, such as decorative coatings for glassware, chinaware, and the like. They also have found use in recent years as colored borders around glass sheets used for automotive windshields, sidelights and backlights. The colored borders enhance appearance and prevent the degradation of underlying adhesives by UV radiation.

In general, these enamel compositions consist mainly of a glass frit, a colorant and an organic vehicle. They are applied to a glass substrate and subsequently fired to burn off the organic vehicle and fuse the frit to the substrate.

Glass sheets for automotive use are generally coated with the ceramic enamel composition and then subjected to a pressure forming process at elevated temperatures. During this treatment the enamel melts and fuses to the glass substrate and the glass is formed into a desired final shape. However, many prior art coatings exhibit a tendency to adhere to the materials covering the forming die, e.g., a fiberglass or metal fiber covered die, because these conventional enamels have a low viscosity after melting and have a tendency to stick to other materials at high temperature. Accordingly, such previous enamels are not suitable for use in glass forming processes in which the heated glass coated with enamel contacts a forming die.

Various proposals have been made in an effort to facilitate the forming of glass sheets with a ceramic enamel coated thereon, and to resist elevated bending or forming temperatures without the enamel adhering to the forming die. For example, U.S. Pat. Nos. 4,596,590 and 4,770,685 propose the addition of a low valent metal oxide powder, e.g., cuprous oxide, to the paint composition to provide a non-stick barrier between the coating and the fiberglass-covered forming die. U.S. Pat. Nos. 4,684,389; 4,857,096; 5,037,783 and EP 490,611 (issued to Boaz), propose adding finely divided zinc metal powder for a similar effect. The use of an iron metal powder is proposed in U.S. Pat. No. 4,983,196 (issued to Stotka).

A purportedly improved anti-stick ceramic enamel composition is proposed by U.S. Pat. Nos. 5,153,150; 5,208,191 and 5,286,270 (issued to Ruderer et al.) wherein a seed powder containing $Zn_2SiO_4$ is introduced into an oxide composition with or without the presence of bismuth oxide ($Bi_2O_3$).

A further shortcoming of a number of previous ceramic enamel systems is that they employ a lead-containing glass frit. For environmental considerations it is desirable to avoid the use of any lead-containing system.

Also, while several of the above-mentioned enamel systems may perform satisfactorily in conventional glass forming processes, some may not be suitable for use in the newly-developed "deep bend" processes for forming automotive glass. Moreover, the enamel compositions must resist chemical agents that may come into contact with them.

Previously known or proposed enamel compositions suffer from one or more of the deficiencies noted above. In contrast, the present invention provides a ceramic enamel composition that overcomes these shortcomings.

SUMMARY OF THE INVENTION

The present invention is for a ceramic enamel composition that forms an at least partially crystalline zinc borate material on a glass substrate upon fusing at high temperature.

A ceramic enamel composition of the invention comprises 30–70% by weight of a zinc-containing oxide frit, 1–25% by weight of a crystalline zinc borate seed material, 19–35% by weight of a pigment, and 10–40% by weight of an organic vehicle. The zinc borate seed material is preferably provided as seed crystals in the composition, and may be further generated from zinc oxide and boron oxide in the composition, e.g., as provided by the zinc-containing oxide frit, upon firing the composition, as when the seed material provides nuclei for further crystal growth.

Preferably the crystalline zinc borate seed material is provided as seed crystals in the composition. The crystalline seed material can be selected from any known phase of the Zn/B phase system. More preferably, the zinc borate seed crystals contain at least one phase selected from $Zn_3B_2O_6$ and $Zn(BO_2)_2$.

A method of preparing an instant ceramic enamel composition comprises combining in no particular order the aforementioned components in the desired amounts.

The invention is also for a method of using the aforesaid ceramic enamel with a glass substrate, so as to form a colored border and/or UV resistant border around the periphery thereof. Thus, a glass substrate is provided with a ceramic enamel coating by applying an aforementioned ceramic enamel composition to the glass substrate, and firing the coated glass substrate to fuse components of the ceramic enamel composition to the glass substrate.

Accordingly, a glass substrate having a ceramic enamel coating adherent thereto is contemplated, in which the ceramic enamel coating is composed at least in part of a crystalline zinc borate material. Preferably, the coating is provided on at least a portion of the periphery of the glass substrate.

Furthermore, a method of forming a glass substrate provided with an instant coating is described, which comprises (a) applying an aforementioned ceramic enamel composition to a glass substrate; (b) heating the coated glass to an elevated temperature, preferably at least 1200° F. and more preferably about 1300° F.; (c) subjecting the heated glass to a conventional forming pressure, typically in the range of 1 to 3 psi (but not limited to this range), and preferably about 2 psi, with a forming die; and (d) separating the formed glass from the die.

Among the advantages of an instant enamel are its excellent anti-stick properties, good consistency, broad temperature firing range, low stress, and low cost.

The invention will now be described in more detail and with reference to examples.

DETAILED DESCRIPTION OF THE INVENTION

The present invention provides a ceramic enamel composition that contains at least one zinc borate seed material as a component. Such a zinc borate seed material is described more fully hereinbelow.

A composition of the invention contains the following components: (1) at least one conventional zinc-containing oxide glass frit; (2) a zinc borate seed material; (3) a colorant (pigment); and (4) a vehicle for components (1)–(3). The zinc borate seed material is believed to assist in nucleating and growing microcrystalline structures, e.g., crystalline zinc borate phases, in the composition upon firing. Although vehicle (4) is preferably provided in the composition, it can be omitted, and applied later, e.g., at the time of silkscreening, without departing from the essence of the present invention.

Typically, an instant ceramic enamel composition comprises 30–70% by weight of a zinc-containing oxide frit, 1–25% by weight of a zinc borate seed material, 19–35% by weight of a pigment, and 10–40% by weight of an organic vehicle. More preferably, a zinc borate seed material is provided in an amount of 10–20% by weight (7.5–15% including organics), and the zinc-containing oxide frit is provided in an amount of 47–62% by weight (45–50% including organics).

As referred to herein, the terms crystal, crystalline, microcrystalline, and the like, mean that the subject material is sufficiently crystalline (ordered) to reveal one or more discrete phase(s) by X-ray diffraction techniques.

While not wishing to be bound by theory, it is believed that the presence of the zinc borate seed material causes nucleation and growth of crystals leading to increased refractoriness and devitrification. The devitrification involves the separation of microcrystalline structures, such as $Zn_3B_2O_6$ and $Zn(BO_2)2$, and the like, in the fused enamel. The presence of these microcrystalline structures in the fused enamel is believed to greatly reduce the tendency of the enamel to stick to surfaces, e.g., pressing pads, during the shaping of the glass substrate at elevated temperature.

In respect to a zinc-containing oxide frit employed in the invention, a conventional ceramic oxide frit, such as a zinc-based frit, can be employed. The frit can contain a boron source in addition to a zinc source. For instance, a frit composed of zinc oxide and boron oxide, and optionally additional materials, can be used. Also, a frit composed of zinc borosilicate, or one composed of a noncrystalline zinc borate material, can be used. Preferably, such a frit is formulated to generate in situ upon heating the requisite zinc borate microcrystalline structures. A blend of two or more conventional glass frits can be employed to obtain a zinc-containing frit having the desired properties.

Preferably, however, a crystalline zinc borate seed material is provided directly in the enamel composition. The crystalline zinc borate seed material can be provided in the composition at high levels, e.g., 25% or higher, of the solids present in the composition. However, at least some oxide frit is desirable in the composition in order to provide a flux.

Preferred zinc borate seed materials for this type of reactive system can include, but are not limited by, the phases $Zn_3B_2O_6$ and $Zn(BO_2)_2$, and mixtures thereof. Any one or all of these compounds are preferably crystalline and may be present as a mixture within the same crystalline material.

A crystalline zinc borate material suitable for use in the present invention can be prepared according to any of a number of well known methods. For instance, $Zn_3B_2O_6$ (CAS Registry No. 1332-07-6) can be prepared by heating zinc oxide (ZnO) and $H_3BO_3$ in a molar ratio of 3:2 at 1000° C. for 48 hours. $Zn(BO_2)_2$ (CAS Registry No. 1332-07-6) can be prepared by mixing zinc oxide and boron oxide at a 1:1 molar ratio and heating the mixture to 600–900° C.

Other methods of preparing these and related materials are readily apparent to the skilled practitioner.

The particle size for an instant zinc borate seed material is preferably in the range of 1–4 microns, more preferably about 1.8 microns.

Additional crystalline materials can be used as fillers, such as alumina-silicate compounds, calcium silicate compounds, boro-alumina-silicate compounds, soda-calcia-alumina-silicate compounds, feldspar compounds, titania, and mixtures thereof, can also be included in the formulation. Still further metallic and/or oxide materials can be added, especially when their presence promotes the nucleation and growth of the requisite zinc borate microcrystalline structures.

As presently preferred, an enamel composition of the invention contains a base glass frit which is at least one conventional zinc-containing frit, such as those commercially available from Cerdec Corporation (Washington, Pa.). Such frits can be employed alone or can be blended to achieve the desired properties. In general, these frits are lead-free because of the above-mentioned environmental considerations although the use of lead-containing frits is not excluded where conditions permit. Other suitable zinc-containing frits are well known in the art.

A representative formulation for a suitable zinc-containing frit has a composition as follows.

| Oxide | Weight % Range |
|---|---|
| $SiO_2$ | 10–25 |
| $Bi_2O_3$ | 0–15 |
| ZnO | 10–50 |
| $B_2O_3$ | 20–40 |
| $Na_2O$ | 7–10 |
| CaO | 0–10 |
| $TiO_2$ | 0–2 |
| $Al_2O_3$ | 0–5 |
| $ZrO_2$ | 0–2 |
| $F_2$ | 0–2 |

A method of making such a frit is disclosed in U.S. Pat. No. 5,346,651 (issued to Oprosky et al.). The frits have a sufficiently low firing temperature to ensure adequate adhesion to the substrate and also possess low density characteristics.

Exemplary zinc-containing frits suitable for use with the invention are commercially available from Cerdec Corporation as E-8012, RD-2012, PD997, GAL1943, and RD-2060.

The pigment of a ceramic enamel of the invention can be any of those commercially available. Particularly preferred pigments are commercially available from Cerdec Corporation as *2991 pigment, which is a copper chromite black pigment, *2980 pigment, which is a cobalt chromium iron black pigment, and *2987 pigment, which is a nickel manganese iron chromium black pigment.

The vehicle to be employed in the compositions is selected on the basis of its end use application. The vehicle should adequately suspend the particulates and burn off completely upon firing of the composition on the substrate. Vehicles are typically organic and include compositions based on pine oils, vegetable oils, mineral oils, low molecular weight petroleum fractions, tridecyl alcohol, synthetic and natural resins, and the like.

Correspondingly, UV-base vehicles are equally applicable for use in the invention. Such UV-base vehicles are well known in the art and are generally composed of polymerizable monomers and/or oligomers containing, for example, acrylate or methacrylate functional groups, together with photoinitiators and polymerization inhibitors. Representative vehicles are disclosed in U.S. Pat. Nos. 4,306,012 and 4,649,062. As is recognized, such vehicles are cured with ultraviolet radiation after application to the substrate.

The specific vehicle and amounts employed are selected based upon the specific components of the composition and the desired viscosity. In general, the amount of the vehicle is about 10 to about 40% by weight based upon the total weight of the enamel composition.

In general, the enamel compositions are viscous in nature, with the viscosity depending upon the application method employed and the end use. For purposes of screen-printing, viscosities ranging from 10,000 to 80,000 and preferably 35,000 to 65,000, centipoises at 20° C., as determined on a Brookfield Viscometer, #7 spindle at 20 rpm, are appropriate.

An enamel of the invention may also contain commonly used fillers, such as silica and alumina, and other conventional additives, such as iron, silicon, zinc, and the like, to enhance desired properties, such as resistance to silver bleed-through.

To prepare an enamel composition of the invention, a frit is ground to a fine powder using conventional methods and is combined in any order with an aforementioned zinc borate seed material, a pigment, any fillers, and a vehicle. When the zinc borate seed material of the composition is desired to be crystalline, it is also added. Other oxides, as discussed above, can be added, as well as materials which resist silver bleed-through. More than one representative of each of the different types of components mentioned above can be provided in the enamel composition.

Once the enamel composition is prepared it can be applied to a glass substrate in a conventional manner, such as by screen printing, decal application, spraying, brushing, roller coating, and the like. Screen printing is preferred when the composition is applied to glass substrates.

After application of the composition to a substrate in a desired pattern, the applied coating is then fired to bond the enamel to the substrate. The firing temperature is generally determined by the frit maturing temperature, and preferably is in a broad temperature range. Typically, the firing range for an instant composition is in the range of 1100–1350° F., more preferably in the range of 1200–1300° F., and most preferably about 1250° F.

The following examples represent preferred embodiments of the invention. They are presented to explain the invention in more detail, and do not limit the invention.

EXAMPLE 1

An enamel composition consisting of the following components was prepared by conventional methods. The indicated weight percentages were calculated on the basis of a printing medium being excluded from the composition.

| Component | Weight % |
|---|---|
| RD2060[1] | 32 |
| PD997[1] | 30 |
| *2991 pigment[2] | 24 |
| Zinc borate seed[3] | 14 |

[1]RD2060 and PD997 are zinc-containing frits commercially available from Cerdec Corporation.
[2]*2991 pigment is commercially available from Cerdec Corporation.
[3]zinc borate seed crystals were prepared by reacting zinc oxide and boron oxide as described, with X-ray diffraction analysis indicating the presence of $Zn_3B_2O_6$.

EXAMPLE 2

An enamel composition was prepared according to the method of Example 1, in which the enamel had the weight percentages indicated below. The zinc borate seed crystals and other components, as noted, were the same as described in Example 1.

| Component | Weight % |
|---|---|
| GAL1943[1] | 30 |
| PD997 | 26 |
| *2991 pigment | 27 |
| Zinc borate seed | 17 |

[1]GAL1943 is a zinc-containing frit commercially available from Cerdec Corporation.

EXAMPLE 3

An enamel composition was prepared according to the method of Example 1 which had the weight percentages indicated below. The zinc borate seed crystals and other components, as noted, were the same as described in Example 1.

| Component | Weight % |
|---|---|
| E-8012[1] | 45 |
| PD997 | 25 |
| *2991 pigment | 25 |
| Zinc borate seed | 5 |

[1]E-8012 is a zinc-containing frit commercially available from Cerdec Corporation.

EXAMPLE 4

An enamel composition was prepared according to the method of Example 1 which had the weight percentages indicated below. The zinc borate seed crystals and other components, as noted, were the same as described in Examples 1 and 3.

| Component | Weight % |
|---|---|
| E-8012 | 20 |
| RD-2012[1] | 40 |
| *2991 pigment | 31 |
| Zinc borate seed | 7.5 |
| Silicon metal[2] | 1.5 |

[1]RD-2012 is a zinc-containing frit commercially available from Cerdec Corporation.
[2]The silicon metal is a silver bleed-through additive and was obtained from Elkem.

EXAMPLE 5

The following solubilized enamel composition represents a typical formulation that can be used for screen printing onto a glass substrate to be fired and press-formed.

| Ingredient | Weight % |
|---|---|
| Zn-containing frit | 45 |
| Pigment | 19 |
| Zinc borate seed crystals | 11 |
| Vehicle | 25 |

The present invention has been described by way of illustration and example, and is not limited by the particular embodiments set forth above. Therefore, it should be appreciated by one skilled in the art that certain obvious modifications equivalent to the present invention can be practiced within the scope of the appended claims.

What is claimed is:

1. A method of forming a glass substrate with an adherent ceramic enamel coating comprising applying a ceramic enamel composition comprising 30–70% by weight of a zinc-containing oxide frit, 1–25% by weight of a crystalline zinc borate seed material 19–35% by weight of a pigment and 10–40% by weight of an organic vehicle to the glass substrate and heating the coated glass substrate to an elevated temperature to fuse components of the ceramic enamel composition to the glass substrate.

2. The method of claim 1, wherein the ceramic enamel composition is applied to at least a portion of the periphery of the glass substrate.

3. The method of claim 1, further comprising subjecting the heated glass to a forming pressure with a die, and separating the formed glass from the die.

* * * * *